(12) United States Patent
Hu

(10) Patent No.: US 10,663,819 B2
(45) Date of Patent: May 26, 2020

(54) OPPOSITE SUBSTRATE AND PREPARATION METHOD THEREOF, AND DISPLAY DEVICE

(71) Applicant: SHENZHEN CHINA STAR OPTOELECTRONICS TECHNOLOGY CO., LTD., Shenzhen, Guangdong (CN)

(72) Inventor: Xiaobo Hu, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/322,063

(22) PCT Filed: Sep. 13, 2018

(86) PCT No.: PCT/CN2018/105433
§ 371 (c)(1),
(2) Date: Jan. 30, 2019

(87) PCT Pub. No.: WO2020/029369
PCT Pub. Date: Feb. 13, 2020

(65) Prior Publication Data
US 2020/0050066 A1    Feb. 13, 2020

(30) Foreign Application Priority Data

Aug. 7, 2018  (CN) .......................... 2018 1 0889482

(51) Int. Cl.
*G02F 1/1362* (2006.01)
*G02F 1/155* (2006.01)
*G02F 1/1335* (2006.01)

(52) U.S. Cl.
CPC .. *G02F 1/136209* (2013.01); *G02F 1/133514* (2013.01); *G02F 1/155* (2013.01)

(58) Field of Classification Search
None
See application file for complete search history.

(56) References Cited

U.S. PATENT DOCUMENTS

| 4,278,329 A | * | 7/1981 | Matsuhiro | ............... G02F 1/155 359/275 |
| 6,219,173 B1 | * | 4/2001 | Udaka | .................. G02F 1/1506 359/270 |

(Continued)

FOREIGN PATENT DOCUMENTS

| CN | 103069505 A | | 4/2013 |
| CN | 104035251 | * | 9/2014 |

(Continued)

*Primary Examiner* — Ryan Crockett
(74) *Attorney, Agent, or Firm* — Maschoff Brennan

(57) ABSTRACT

The present disclosure discloses an opposite substrate including a base substrate and a common electrode layer, wherein the common electrode layer includes a protective layer, a first electrode layer and a second electrode layer sequentially disposed on the base substrate, a material of the protective layer is a transparent insulating material, the first electrode layer is configured to be capable of transmitting visible light and reflecting infrared light, a material of the first electrode layer is Ag, and a material of the second electrode layer is a transparent conductive material. The present disclosure further discloses a preparation method of the opposite substrate as mentioned above and a display device including the opposite substrate as mentioned above. The opposite substrate provided in the present disclosure is disposed with a first electrode layer capable of reflecting infrared light and transmitting visible light therein and is applied to the display device. A problem of the display device can be resolved that a device is overheated due to infrared radiation of an external environment.

16 Claims, 4 Drawing Sheets

(56) References Cited

U.S. PATENT DOCUMENTS

| | | | | |
|---|---|---|---|---|
| 10,338,444 B2* | 7/2019 | Zhang | ................ | G02F 1/136209 |
| 2003/0042839 A1* | 3/2003 | Ishimoto | .................. | H01J 11/18 |
| | | | | 313/484 |
| 2004/0233374 A1* | 11/2004 | Yamazaki | ............. | G02F 1/1341 |
| | | | | 349/153 |
| 2007/0002422 A1* | 1/2007 | O'Shaughnessy | ...... | G02F 1/153 |
| | | | | 359/265 |
| 2011/0181939 A1* | 7/2011 | Bressand | .......... | B32B 17/10036 |
| | | | | 359/270 |
| 2015/0146276 A1* | 5/2015 | Kim | ...................... | G02F 1/1506 |
| | | | | 359/270 |
| 2016/0011482 A1* | 1/2016 | Danine | .................. | B60R 1/088 |
| | | | | 359/268 |
| 2017/0322473 A1* | 11/2017 | Brossard | ............... | G02F 1/1533 |
| 2018/0011385 A1* | 1/2018 | Kang | .................... | G06F 3/0412 |

FOREIGN PATENT DOCUMENTS

| | | |
|---|---|---|
| CN | 104035251 A | 9/2014 |
| CN | 104332475 A | 2/2015 |
| CN | 105679416 A | 6/2016 |
| CN | 106990597 A | 7/2017 |
| WO | 2017/170767 A1 | 3/2017 |

* cited by examiner

OPPOSITE SUBSTRATE AND PREPARATION METHOD THEREOF, AND DISPLAY DEVICE

TECHNICAL FIELD

The present disclosure relates to a field of display technology, particularly relates to an opposite substrate and a preparation method thereof, and further relates to a display device including the opposite substrate.

BACKGROUND ART

A liquid crystal display (LCD) device has many advantages of thin body, power saving, non-radiation and the like, and is widely applied. It has been very popular in daily life, such as a display screen of a television, a computer, a phone and the like.

A development trend of the LCD device is that a size is getting larger and larger, a power is getting higher and higher, application requirements are more and more, a display area of a display panel is required to be maximized as far as possible, and a working environment thereof is also required to be developed from indoor to outdoor. When the LCD device is applied to an outdoor environment, it may be exposed to sunlight having radiant energy of 1 kW/m$^2$. A temperature which is too high may cause an aging speed of the LCD device to be accelerated and a life thereof to be shortened. More seriously, when a certain temperature range is exceeded, a liquid crystal state of liquid crystal molecules in the LCD device may disappear and become a liquid state, and thus, the LCD device is caused to fail and cannot work normally.

In the outdoor environment, the heat of sunlight is mainly transmitted through infrared light. Thus, on the premise that the normal display is not affected, how to prevent the infrared light in the sunlight from being incident to an inside of the LCD device, and especially prevent the infrared light from being incident to a liquid crystal layer therein, is a problem needed to be resolved in the industry.

SUMMARY

In view of this, the present disclosure provides an opposite substrate, which can resolve a problem of the display device that a device is overheated due to infrared radiation of an external environment and effectively prolong a working life of the display device in the outdoor environment.

In order to achieve the above purpose, the present disclosure adopts the following technical solution:

an opposite substrate includes a base substrate and a common electrode layer, wherein the common electrode layer includes a protective layer, a first electrode layer and a second electrode layer sequentially disposed on the base substrate, a material of the protective layer is a transparent insulating material, the first electrode layer is configured to be capable of transmitting visible light and reflecting infrared light, a material of the first electrode layer is Ag, and a material of the second electrode layer is a transparent conductive material.

Wherein a thickness of the first electrode layer is 50 Å~200 Å.

Wherein the material of the protective layer is TiO$_2$, SiO$_2$ or SiN$_x$.

Wherein a thickness of the protective layer is 100 Å~350 Å.

Wherein the material of the second electrode layer is ITO, IZO, ZTO or FTO.

Wherein a thickness of the second electrode layer is 100 Å~350 Å.

Wherein the opposite substrate further includes a color filter layer including color photoresist units disposed on the base substrate and a black matrix separating the respective color photoresist units from each other; and wherein the protective layer is overlaid on the color filter layer, the first electrode layer is disposed on the protective layer, the second electrode layer is disposed on the first electrode layer, and the color photoresist units include a red photoresist unit, a green photoresist unit and a blue photoresist unit.

The present disclosure further provides a preparation method of an opposite substrate including:

providing a base substrate;

preparing and forming a protective layer on the base substrate by applying a deposition process, a material of the protective layer being TiO$_2$, SiO$_2$ or SiN$_x$, and a thickness of the protective layer being 100 Å~350 Å;

preparing and forming a first electrode layer on the protective layer by applying the deposition process, the first electrode layer being configured to be capable of transmitting visible light and reflecting infrared light, a material of the first electrode layer being Ag, and a thickness of the first electrode layer being 50 Å~200 Å; and preparing and forming a second electrode layer on the first electrode layer by applying the deposition process, a material of the second electrode layer being ITO, IZO, ZTO or FTO, and a thickness of the second electrode layer being 100 Å~350 Å.

Further, before preparing and forming the protective layer, a color filter layer is first prepared and formed on the base substrate, wherein the color filter layer includes color photoresist units disposed on the base substrate and a black matrix separating the respective color photoresist units from each other, the protective layer is overlaid on the color filter layer, and the color photoresist units include a red photoresist unit, a green photoresist unit and a blue photoresist unit.

Another aspect of the present disclosure is to provide a display device including a thin film transistor array substrate and an opposite substrate disposed oppositely, wherein the opposite substrate is the opposite substrate as described above.

The opposite substrate provided in the embodiments of the present disclosure is disposed with a first electrode layer capable of reflecting infrared light and transmitting visible light therein and is applied to the display device. On the premise that the normal display is not affected, the first electrode layer can block the infrared light in the sunlight from being incident to an inside of the display device, and especially prevent the infrared light from being incident to a liquid crystal layer therein. Thus, a problem of the display device is resolved that a device is overheated due to infrared radiation of an external environment, and a working life of the display device in the outdoor environment is effectively prolonged.

DETAILED DESCRIPTION OF EXEMPLARY EMBODIMENTS

Figure 1:
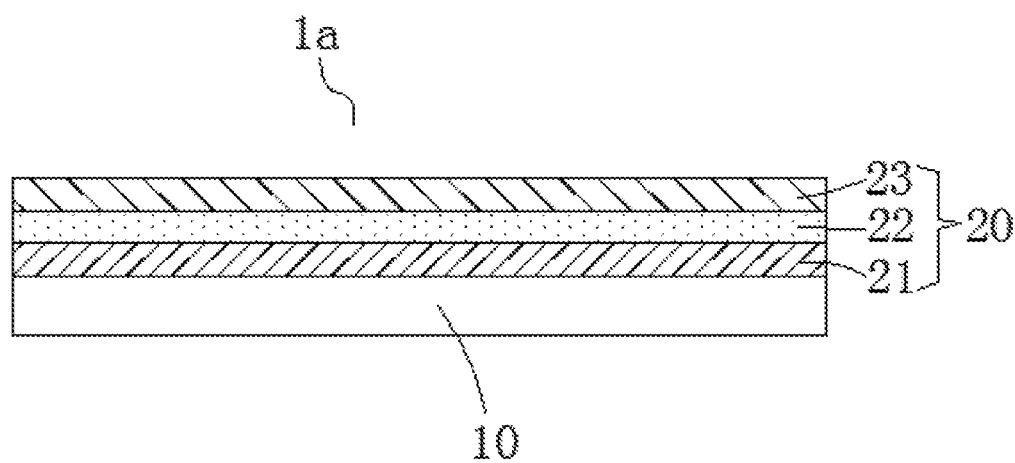
FIG. 1 is a structural schematic diagram of an opposite substrate provided in Embodiment 1 of the present disclosure.

In order to make purposes, technical solutions, and advantages of the present disclosure clearer, specific embodiments of the present disclosure will be described in details in conjunction with the drawings below. The preferred embodiments are exemplified in the drawings. The embodiments of the present disclosure, which are illustrated in the drawings and described according to the drawings, are only exemplified, and the present disclosure is not limited to these embodiments.

Herein, it is further necessary to explain that in order to prevent the present disclosure from being obscured due to unnecessary details, only structures and/or processing steps closely related to the solution according to the present disclosure are illustrated in the drawings, while other details less related to the present disclosure are omitted.

Embodiment 1

The present embodiment first provides an opposite substrate, which refers to a substrate disposed opposite to a thin film transistor array substrate in a display device. As shown in FIG. 1, an opposite substrate 1a includes a base substrate 10 and a common electrode layer 20 disposed on the base substrate 10, and the common electrode layer 20 includes a protective layer 21, a first electrode layer 22 and a second electrode layer 23 sequentially disposed on the base substrate 10. Wherein a material of the protective layer 21 is a transparent insulating material. A material of the first electrode layer 22 is a conductive material, and the first electrode layer 22 is configured to be capable of transmitting visible light and reflecting infrared light. A material of the second electrode layer 23 is a transparent conductive material.

Wherein the common electrode layer 20 is a composite thin film layer including the protective layer 21, the first electrode layer 22 and the second electrode layer 23, and conductive performance and transmittance to the visible light thereof need to satisfy requirements as an electrode layer of the display device. Thus, in the present embodiment, materials and thicknesses of the protective layer 21, the first electrode layer 22 and the second electrode layer 23 need to be specifically selected according to preset requirements for conductive performance and transmittance. Generally, a transmittance of the composite thin film of the common electrode layer 20 needs to reach 80% or above, and a surface square resistance thereof can be 8~20 Ω/□.

In the present embodiment, the material of the protective layer 21 can be selected as a transparent insulating material such as $TiO_2$, $SiO_2$ or $SiN_x$, etc. $TiO_2$ is preferably selected, and selecting to use $TiO_2$ as the material of the protective layer 21, firstly, can perform a function of insulation protection, and secondly, can perform a function of transmission enhancement for display light (visible light) emitted by the display device. Further, a thickness of the protective layer 21 can be set within a range of 100 Å~350 Å.

Figure 2:
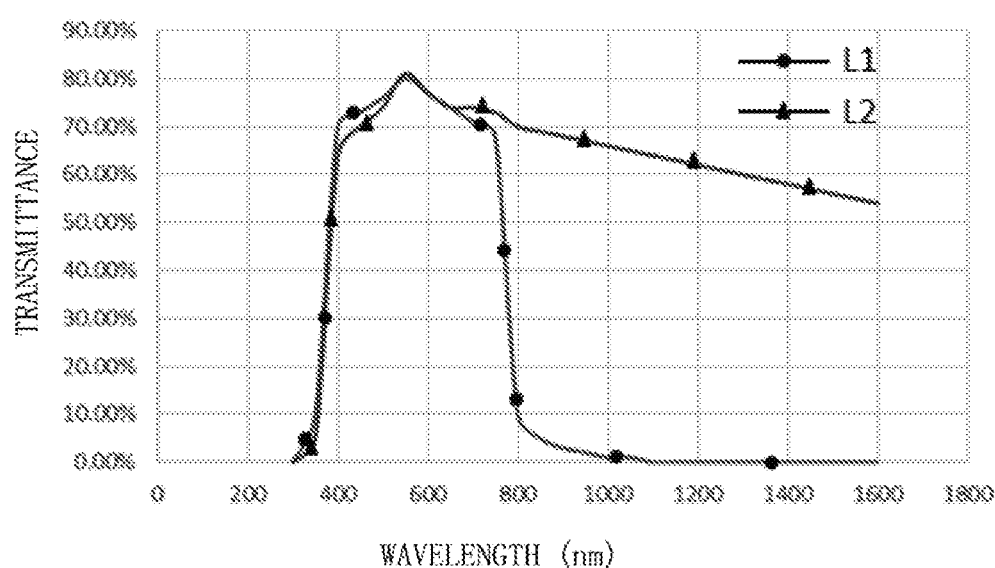
FIG. 2 is a transmittance curve of a common electrode layer in an embodiment of the present disclosure.

In the present embodiment, a material of the first electrode layer 22 is Ag, and a thickness thereof can be set within a range of 50 Å~200 Å. It is proved through verification that an Ag thin film layer has a high reflectance function to the infrared light, and when a thickness thereof is set within a range of 50 Å~200 Å, it has a higher transmittance to the visible light. The thickness of the Ag thin film layer is more preferably set within a range of 90 Å~110 Å. FIG. 2 is a transmittance curve diagram of the common electrode layer: wherein a curve L1 is a transmittance curve of the common electrode layer 20 including the Ag thin film layer (the thickness is 100 Å) as provided above, and a curve L2 is a transmittance curve of a traditional common electrode layer not including the Ag thin film layer as a comparison. It can be known by comparing the curves L1 and L2 that after adding the Ag thin film layer, its transmittance to a visible light waveband does not have an obvious distinction in comparison with the structure not including the Ag thin film layer, and is even slightly improved, while its transmittance to an infrared light waveband is greatly reduced in comparison with the structure not including the Ag thin film layer.

In the present embodiment, the material of the second electrode layer 23 is a transparent conductive oxide, such as ITO, which has a good conductive function and a higher transmittance to the display light (visible light) emitted by the display device. The material of the second electrode layer 23 can also be a transparent conductive oxide, such as IZO, ZTO, or FTO, etc. Further, a thickness of the second electrode layer 23 can be set within a range of 100 Å~350 Å.

Figure 3:
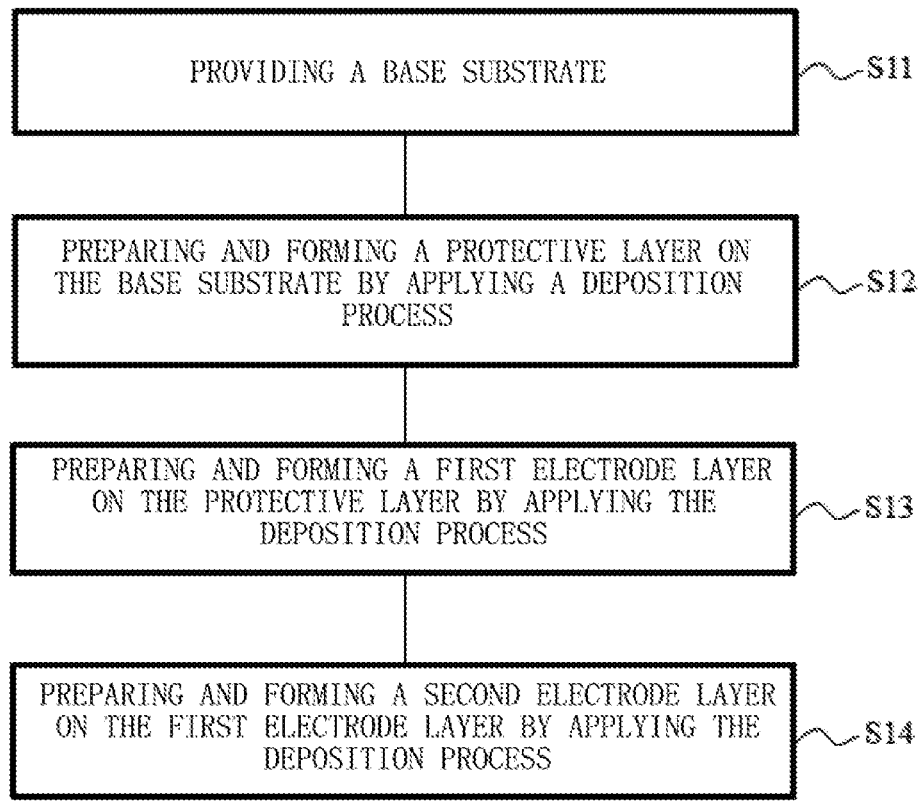
FIG. 3 is a process flow diagram of a preparation method of the opposite substrate provided in Embodiment 1 of the present disclosure.

The present embodiment further provides a preparation method of the opposite substrate as mentioned above. Referring to FIG. 1 and FIG. 3, the preparation method includes the following steps:

S11. providing a base substrate 10. Specifically, the base substrate 10 can be selected as a rigid glass substrate, and can also be selected as a flexible substrate.

S12. Preparing and forming a protective layer 21 on the base substrate 10 by applying a deposition process. Specifically, a material of the protective layer 21 can be selected as $TiO_2$, $SiO_2$ or $SiN_x$, and a thickness of the protective layer 21 is set within a range of 100 Å~50 Å.

S13. Preparing and forming a first electrode layer 22 on the protective layer 21 by applying the deposition process. Specifically, the first electrode layer 22 is configured to be capable of transmitting visible light and reflecting infrared light. A material of the first electrode layer 22 is Ag. A thickness of the first electrode layer 22 is set within a range of 50 Å~200 Å, and the most preferable range of the thickness is 90 Å~110 Å.

S14. Preparing and forming a second electrode layer 23 on the first electrode layer 22 by applying the deposition process. Specifically, a material of the second electrode layer 23 is ITO, IZO, ZTO or FTO, and a thickness of the second electrode layer 23 is 100 Å~350 Å.

Figure 4:
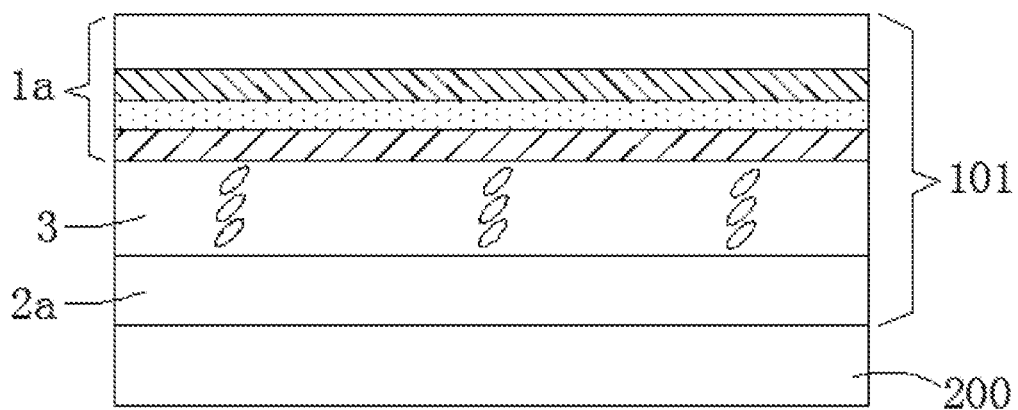
FIG. 4 is a structural schematic diagram of a liquid crystal display device provided in Embodiment 1 of the present disclosure.

The present embodiment further provides a display device, and specifically, a liquid crystal display device. As shown in FIG. 4, the display device includes a backlight unit 200 and a liquid crystal display panel 101. The liquid crystal display panel 101 is disposed on the backlight unit 200. The backlight unit 200 provides display light to the liquid crystal display panel 101 to make the liquid crystal display panel 101 display an image. Wherein the liquid crystal display panel 101 includes a thin film transistor array substrate 2a and the opposite substrate 1a in the present embodiment. The thin film transistor array substrate 2a and the opposite substrate 1a are disposed oppositely. A liquid crystal layer 3 is disposed between the thin film transistor array substrate 2a and the opposite substrate 1a.

In conjunction with FIG. 1 and FIG. 4, in the display device provided in the present embodiment, the opposite substrate 1a is located on one side of a display surface, and is not disposed with a color filter layer therein. The thin film transistor array substrate 2a is disposed not only with a thin film transistor, a data line and a scan line, etc. therein, but also with a color filter layer therein (not shown in the drawings). That is, the thin film transistor array substrate 2a in the present embodiment is a COA (color filter on array) type array substrate. The COA type array substrate is a relatively mature technology of prior art in related art, and thus, its specific structure is not introduced in detail in the present embodiment.

In the opposite substrate and the corresponding display device provided in the present embodiment, the opposite substrate located on one side of the display surface is disposed with a first electrode layer therein, which is capable of reflecting infrared light and transmitting visible light. On the premise that the normal display is not affected, the first electrode layer can block the infrared light in the external environment light (for example, the sunlight) from being incident to an inside of the display device, and especially prevent the infrared light from being incident to a liquid crystal layer therein. Thus, a problem of the display device is resolved that a device is overheated due to infrared radiation of an external environment, and a working life of the display device in the outdoor environment is effectively prolonged.

Embodiment 2

Figure 5:
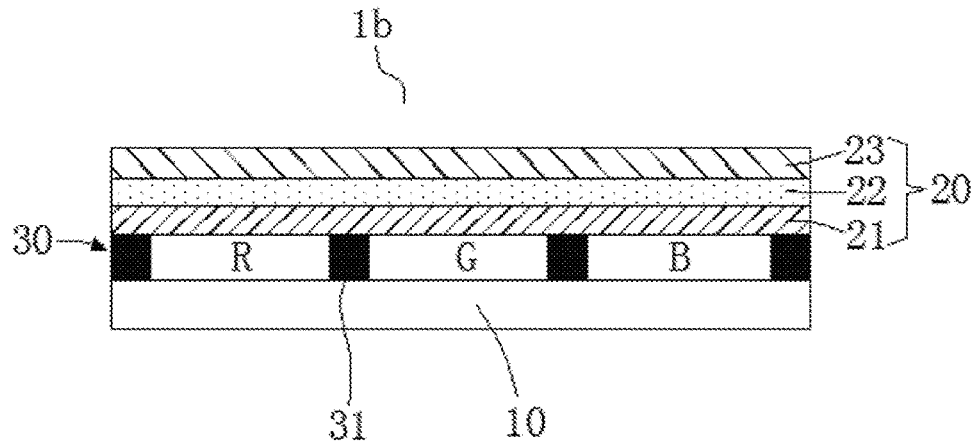
FIG. 5 is a structural schematic diagram of an opposite substrate provided in Embodiment 2 of the present disclosure.

The present embodiment first provides an opposite substrate. As shown in FIG. 5, the same as Embodiment 1, an opposite substrate 1b provided in the present embodiment also includes a base substrate 10 and a common electrode layer 20 disposed on the base substrate 10, and the common electrode layer 20 also includes a protective layer 21, a first electrode layer 22 and a second electrode layer 23 sequentially disposed on the base substrate 10. A specific structure of the common electrode layer 20 in the present embodiment is the same as that in Embodiment 1, and is not described repeatedly herein.

Different from the embodiment, as shown in FIG. 5, the opposite substrate 1b provided in the present embodiment further includes a color filter layer 30 located between the base substrate 10 and the common electrode layer 20. Specifically, the color filter layer 30 includes color photoresist units and a black matrix 31 separating the respective color photoresist units from each other. The color photoresist units include a red photoresist unit R, a green photoresist unit G and a blue photoresist unit B.

Figure 6:
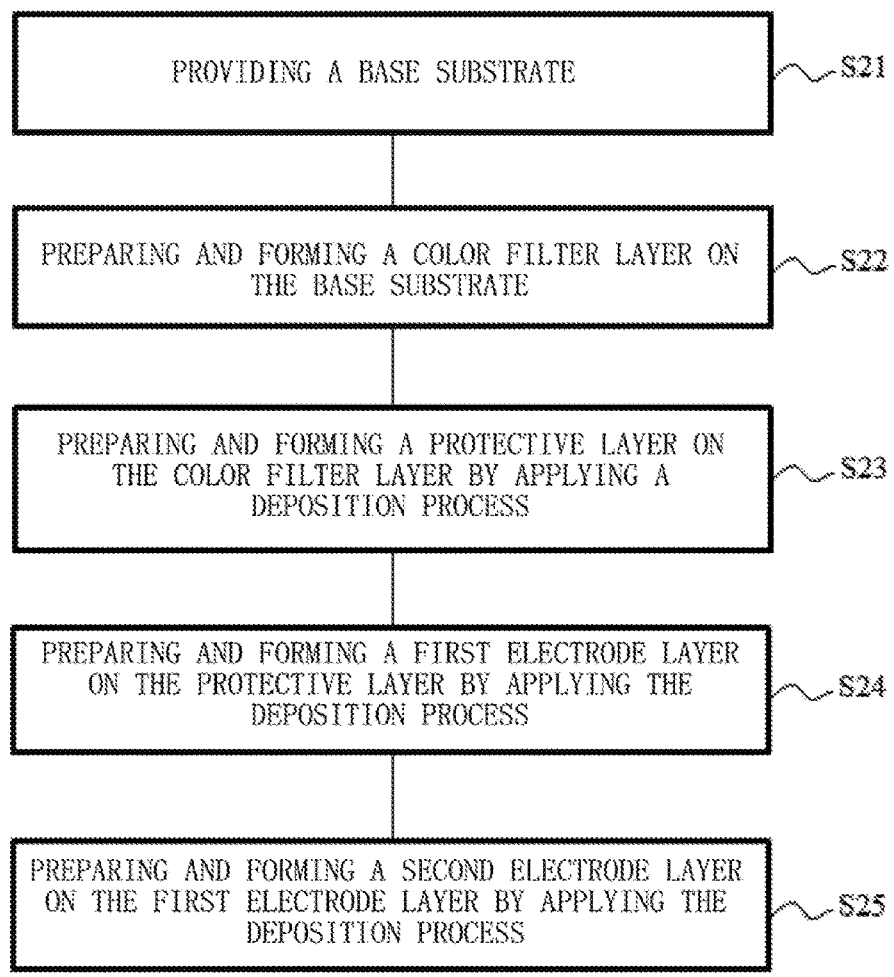
FIG. 6 is a process flow diagram of a preparation method of the opposite substrate provided in Embodiment 2 of the present disclosure.

The present embodiment further provides a preparation method of the opposite substrate as mentioned above. Referring to FIG. 5 and FIG. 6, the preparation method includes the following steps:

S21. providing a base substrate 10. Specifically, the base substrate 10 can be selected as a rigid glass substrate, and can also be selected as a flexible substrate.

S22. Preparing and forming a color filter layer 30 on the base substrate 10. Specifically, the color filter layer 30 includes color photoresist units disposed on the base substrate 10 and a black matrix 31 separating the respective color photoresist units from each other, and the color photoresist units include a red photoresist unit R, a green photoresist unit G and a blue photoresist unit B.

S23. Preparing and forming a protective layer 21 on the color filter layer 30 by applying a deposition process. Specifically, the protective layer 21 is overlaid on the color filter layer 30, a material of the protective layer 21 can be selected as $TiO_2$, $SiO_2$ or $SiN_x$, and a thickness of the protective layer 21 is set within a range of 100 Å~350 Å.

S24. Preparing and forming a first electrode layer 22 on the protective layer 21 by applying the deposition process. Specifically, the first electrode layer 22 is configured to be capable of transmitting visible light and reflecting infrared light. A material of the first electrode layer 22 is Ag. A thickness of the first electrode layer 22 is set within a range of 50 Å~200 Å, and the most preferable range of the thickness is 90 Å~110 Å.

S25. Preparing and forming a second electrode layer 23 on the first electrode layer 22 by applying the deposition process. Specifically, a material of the second electrode layer 23 is ITO, IZO, ZTO or FTO, and a thickness of the second electrode layer 23 is 100 Å~350 Å.

Figure 7:
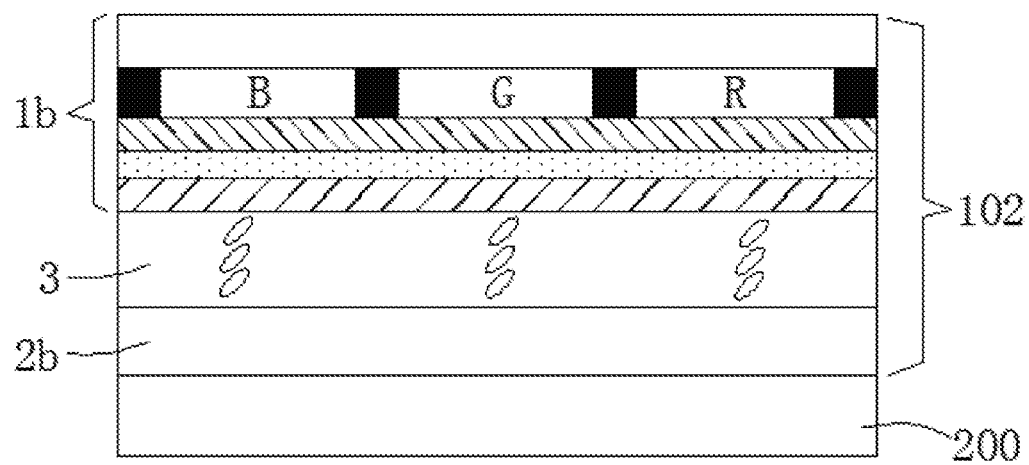
FIG. 7 is a structural schematic diagram of a liquid crystal display device provided in Embodiment 2 of the present disclosure.

Further, the present embodiment further provides a display device. As shown in FIG. 7, the display device includes a backlight unit 200 and a liquid crystal display panel 102, wherein the liquid crystal display panel 102 in the present embodiment is different from the liquid crystal display panel 101 in Embodiment 1.

Specifically, as shown in FIG. 7, the liquid crystal display panel 102 includes a thin film transistor array substrate 2b and the opposite substrate 1b provided in the present embodiment which are disposed oppositely. A liquid crystal layer 3 is disposed between the thin film transistor array substrate 2b and the opposite substrate 1b.

In conjunction with FIG. 5 and FIG. 7, in the display device provided in the present embodiment, the opposite substrate 1b is located on one side of a display surface. Different from Embodiment 1, the opposite substrate 1b is disposed with a color filter layer 30 therein. Thus, the thin film transistor array substrate 2b is not disposed with a color filter layer therein. That is, the thin film transistor array substrate 2b can be selected as any one of non-COA type array substrates in the prior art.

Similar to Embodiment 1, the opposite substrate and the corresponding display device provided in the present embodiment can also block the infrared light in the external environment light from being incident to an inside of the display device, and effectively prolong a working life of the display device in the outdoor environment on the premise that the normal display is not affected.

In conclusion, the opposite substrate provided in the embodiments of the present disclosure can resolve a problem of the display device that a device is overheated due to infrared radiation of an external environment, and effectively prolong a working life of the display device in the outdoor environment.

It should be explained that the relationship terms, such as first and second, etc., in the present specification are only used for distinguishing one entity or operation from another entity or operation without requiring or implying any actual relation or sequence existing between these entities or operations. Moreover, the term "include", "contain" or any other variant means covering non-exclusive inclusion, so that the process, method, object or device including a series of elements not only includes those elements but also includes other elements that are not explicitly listed or further include inherent elements of such process, method, object or device. Where no more limitations are provided, the elements defined by the sentence "include one . . . " do not exclude additional identical elements existing in the process, method, object or device which includes the elements.

The above description is only the specific embodiments of the present application. It should be pointed out that to those ordinarily skilled in the art, several improvements and polish can also be made without departing from the principle of the present application, and these improvements and polish should also be considered as the protection scope of the present application.

What is claimed is:

1. An opposite substrate comprising:
   a base substrate;
   a color filter layer comprising color photoresist units disposed on the base substrate and a black matrix separating the respective color photoresist units from each other; and
   a common electrode layer on the color filter layer,
   wherein:
   the common electrode layer comprises a protective layer, a first electrode layer and a second electrode layer sequentially disposed on the color filter layer,
   a material of the protective layer is a transparent insulating material,
   the first electrode layer is configured to be capable of transmitting visible light and reflecting infrared light,
   a material of the first electrode layer is Ag,
   a material of the second electrode layer is a transparent conductive material, and
   the protective layer is overlaid on the color filter layer, the first electrode layer is disposed on the protective layer, the second electrode layer is disposed on the first electrode layer, and the color photoresist units comprise a red photoresist unit, a green photoresist unit and a blue photoresist unit.

2. The opposite substrate of claim 1, wherein a thickness of the first electrode layer is 50 Å~200 Å.

3. The opposite substrate of claim 1, wherein the material of the protective layer is $TiO_2$, $SiO_2$ or $SiN_x$.

4. The opposite substrate of claim 3, wherein a thickness of the protective layer is 100 Å~350 Å.

5. The opposite substrate of claim 1, wherein the material of the second electrode layer is ITO, IZO, ZTO or FTO.

6. The opposite substrate of claim 5, wherein a thickness of the second electrode layer is 100 Å~350 Å.

7. A preparation method of an opposite substrate comprising:
   providing a base substrate;
   preparing and forming a color filter layer on the base substrate;
   preparing and forming a protective layer on the color filter layer by applying a deposition process, a material of the protective layer being $TiO_2$, $SiO_2$ or $SiN_x$;
   preparing and forming a first electrode layer on the protective layer by applying the deposition process, the first electrode layer being configured to be capable of transmitting visible light and reflecting infrared light, and a material of the first electrode layer being Ag; and
   preparing and forming a second electrode layer on the first electrode layer by applying the deposition process, a material of the second electrode layer being ITO, IZO, ZTO or FTO,
   wherein the color filter layer comprises color photoresist units disposed on the base substrate and a black matrix separating the respective color photoresist units from each other, the protective layer is overlaid on the color filter layer, and the color photoresist units comprise a red photoresist unit, a green photoresist unit and a blue photoresist unit.

8. The preparation method of the opposite substrate of claim 7, wherein a thickness of the protective layer is 100 Å~350 Å.

9. The preparation method of the opposite substrate of claim 7, wherein a thickness of the first electrode layer is 50 Å~200 Å.

10. The preparation method of the opposite substrate of claim 7, wherein a thickness of the second electrode layer is 100 Å~350 Å.

11. A display device comprising a thin film transistor array substrate and an opposite substrate disposed oppositely, wherein:
    the opposite substrate comprises a base substrate, a color filter layer on the base substrate, and a common electrode layer on the color filter layer,
    the color filter layer comprises color photoresist units disposed on the base substrate and a black matrix separating the respective color photoresist units from each other,
    the common electrode layer comprises a protective layer, a first electrode layer and a second electrode layer sequentially disposed on the color filter layer,
    a material of the protective layer is a transparent insulating material,
    the first electrode layer is configured to be capable of transmitting visible light and reflecting infrared light,
    a material of the first electrode layer is Ag,
    a material of the second electrode layer is a transparent conductive material, and
    the protective layer is overlaid on the color filter layer, the first electrode layer is disposed on the protective layer, the second electrode layer is disposed on the first electrode layer, and the color photoresist units comprise a red photoresist unit, a green photoresist unit and a blue photoresist unit.

12. The display device of claim 11, wherein a thickness of the first electrode layer is 50 Å~200 Å.

13. The display device of claim 11, wherein the material of the protective layer is $TiO_2$, $SiO_2$ or $SiN_x$.

14. The display device of claim 13, wherein a thickness of the protective layer is 100 Å~350 Å.

15. The display device of claim 11, wherein the material of the second electrode layer is ITO, IZO, ZTO or FTO.

16. The display device of claim 15, wherein a thickness of the second electrode layer is 100 Å~350 Å.

* * * * *